(12) United States Patent
Ohnemus et al.

(10) Patent No.: US 9,873,317 B2
(45) Date of Patent: Jan. 23, 2018

(54) METHOD FOR MOUNTING DRIVE TRAIN COMPONENTS OF A HYBRID DRIVE

(71) Applicant: Bayerische Motoren Werke Aktiengesellschaft, Munich (DE)

(72) Inventors: Ulrich Ohnemus, Hattenhofen (DE); Reinhard Simkovics, Freising (AT); Lothar Wolf, Holzkirchen (DE); Alexander Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 685 days.

(21) Appl. No.: 13/918,368

(22) Filed: Jun. 14, 2013

(65) Prior Publication Data

US 2013/0291374 A1 Nov. 7, 2013

Related U.S. Application Data

(63) Continuation of application No. PCT/EP2011/005906, filed on Nov. 24, 2011.

(30) Foreign Application Priority Data

Dec. 17, 2010 (DE) .................. 10 2010 063 388

(51) Int. Cl.
*B60K 6/405* (2007.10)
*B60K 6/48* (2007.10)

(52) U.S. Cl.
CPC .............. *B60K 6/405* (2013.01); *B60K 6/48* (2013.01); *Y02T 10/6221* (2013.01); *Y10T 29/49012* (2015.01)

(58) Field of Classification Search
CPC .. B60K 6/405; B60K 6/42; B60K 6/26; Y02T 10/62; Y02T 10/6213; Y10T 29/49012; F16D 1/101; B16F 15/161; F16H 57/00

See application file for complete search history.

(56) References Cited

U.S. PATENT DOCUMENTS 2,785,670 A * 3/1957 Van Briggle ........... H01T 13/14
123/266
6,703,739 B1 3/2004 Schutt et al.
(Continued)

FOREIGN PATENT DOCUMENTS

CN 101018687 A 8/2007
CN 101624006 A 1/2010
(Continued)

OTHER PUBLICATIONS

Tagami, JP 2007 174783 A, 2007 Machine Translation.*
(Continued)

*Primary Examiner* — Jacob Cigna
*Assistant Examiner* — Lee A Holly
(74) *Attorney, Agent, or Firm* — Crowell & Moring LLP

(57) ABSTRACT

A method for mounting the drive train components of a hybrid drive including providing an automatic transmission, which comprises a transmission casing and a transmission input shaft; a hybrid head, which is premounted as a separate assembly and which has a hybrid head casing, a rotor drive element and an output element; and an electric machine, which has a stator and a rotor, wherein the hybrid head casing is connected by flanges to the transmission casing and the output element is coupled in rotation to the transmission input shaft by means of a shaft-hub connection, and wherein the electric machine is subsequently installed in the hybrid head casing, wherein the stator is connected to the hybrid head casing and the rotor is connected to the rotor drive element.

29 Claims, 6 Drawing Sheets

(56) References Cited

U.S. PATENT DOCUMENTS

| | | | |
|---|---|---|---|
| 8,523,726 B2* | 9/2013 | Giessner | B60K 6/405 475/159 |
| 2006/0289209 A1 | 12/2006 | Grosspietsch et al. | |
| 2008/0093135 A1* | 4/2008 | Nomura | B60K 6/26 180/65.24 |
| 2009/0095263 A1* | 4/2009 | Uuzzie | F16H 57/00 123/495 |
| 2010/0090382 A1* | 4/2010 | Carlson | F16F 15/161 267/140.13 |
| 2010/0125016 A1 | 5/2010 | Kempf et al. | |
| 2011/0095634 A1* | 4/2011 | Lamke | B60K 6/48 310/91 |
| 2011/0219894 A1* | 9/2011 | Mencher | F16D 1/101 74/411 |
| 2011/0224043 A1 | 9/2011 | Bachmann et al. | |
| 2011/0240384 A1* | 10/2011 | Roske | B60K 6/38 180/65.22 |

FOREIGN PATENT DOCUMENTS

| | | | |
|---|---|---|---|
| DE | 103 35 810 A1 | 3/2004 | |
| DE | 10 2006 056 512 A1 | 6/2008 | |
| DE | 10 2008 042 636 A1 | 4/2010 | |
| DE | 10 2008 050 054 A1 | 4/2010 | |
| DE | 10 2008 043 290 A1 | 5/2010 | |
| DE | 102009000915 A1 * | 8/2010 | B60K 6/405 |
| EP | 1 736 345 A1 | 12/2006 | |
| EP | 2 143 975 A1 | 1/2010 | |
| JP | 2007174783 A * | 7/2007 | |

OTHER PUBLICATIONS

Chinese Office Action issued in counterpart Chinese Application No. 201180045337.9 dated Aug. 17, 2015, with partial English translation (Seven (7) pages).
Chinese Office Action dated Jan. 6, 2015 (Nine (9) pages).
Chinese Office Action issued in Chinese counterpart application No. 201180045337.9 dated Nov. 17, 2015, with partial English translation (Five (5) pages).
German Search Report dated Dec. 28, 2011 including partial English-language translation (Six (6) pages).
International Search Report dated Mar. 5, 2012. (Six (6) pages).

* cited by examiner

METHOD FOR MOUNTING DRIVE TRAIN COMPONENTS OF A HYBRID DRIVE

CROSS-REFERENCE TO RELATED APPLICATIONS

This application is a continuation of PCT International Application No. PCT/EP2011/005906, filed Nov. 24, 2011, which claims priority under 35 U.S.C. §119 from German Patent Application No. 10 2010 063 388.7, filed Dec. 17, 2010, the entire disclosures of which are expressly incorporated herein by reference.

BACKGROUND AND SUMMARY OF THE INVENTION

The present invention relates to a method for mounting drive train components of a hybrid drive according to the features disclosed in patent claim 1.

For some time now the trend has been to "hybridize" the conventional drives of vehicles. Many manufacturers offer vehicles with an automatic transmission optionally with or without a superposed "hybrid head." For reasons relating to cost, the aim is to change or more specifically to replace as few components as possible in the process of hybridizing a "conventional drive train."

The object of the invention is to provide a method for mounting drive train components of a hybrid drive. In this case the method can be carried out efficiently and takes into consideration that the individual members of the groups of components that are to be mounted or the individual members of the modules that are to be mounted are premounted by the various manufacturers and then delivered. The engineering objective is to make available drive-train components that are designed to optimize the assembly process.

This engineering object is achieved by means of the features disclosed in patent claim 1. Advantageous embodiments and further developments of the invention will be apparent from the dependent claims.

First of all, the invention is not restricted to a method, but rather also comprises the assembly-oriented (optimized) design of the individual components that are used in conjunction with the method.

The core components that are required to carry out the method according to the invention are an automatic transmission and the so-called hybrid head.

The term "automatic transmission" is to be interpreted very broadly. Basically it comprises any and all kinds of transmissions, wherein the ratios or more specifically the gears can be shifted in an electronically controlled manner. The term "automatic transmission" comprises, in particular, planetary-gear automatic transmissions with a plurality of infinitely variable transmission stages. In principle, however, it also comprises automated manual transmissions, wherein the driver can select the individual gear stages by means of a selector element, as well as infinitely variable gears.

Such an automatic transmission comprises a transmission casing and a transmission input shaft.

The term "hybrid head" is to be construed very loosely in the sense of a "torque superposition device" that has at least one first input, a second input and at least one output. The hybrid head has primarily or exclusively mechanical and hydraulic components. A first drive machine, which can be formed, for example, by means of an internal combustion engine, can be coupled with the first input. The rotor of an electric machine can be coupled with the second input of the hybrid head. The transmission input shaft of the automatic transmission can be coupled with the output. The hybrid head is a separate or more specifically autonomous module that is completely preassembled or more specifically can be completely preassembled. This separate module comprises a hybrid head casing, a first and a second drive element as well as an output element. The second drive element is also referred to below as a rotor drive element.

According to the invention, the hybrid head casing is first connected by flanges to the transmission casing of the automatic transmission. The concept "connected by flanges" means that the two casings are connected to each other, for example, by means of threaded connections. In this case the output element of the hybrid head is coupled in rotation with the transmission input shaft of the automatic transmission by means of a shaft-hub connection.

In an additional assembly step the electric machine, which can also be regarded as a separate unit, is installed in the hybrid head casing. In this case the stator of the electric machine is connected to the hybrid head casing; and the rotor is connected to the rotor drive element that forms the second drive element of the hybrid head.

According to the invention, the automatic transmission and/or the preassembled hybrid head and/or the electric machine and/or the hybrid head casing can be installed in an engine chamber by choice either "front/transversely" or "longitudinally." The concept "front/transversely" means that a main rotational axis of the said components is arranged in essence transversely to the longitudinal direction of the vehicle. The concept "longitudinally" means that a main direction of rotation of the said components is arranged in essence parallel to a longitudinal direction of the vehicle.

The automatic transmission, the hybrid head and the electric machine are preferably separate, premounted components that are tested individually for their functionality prior to the "assembly." Each of these components or at least some of these components can be supplied by different suppliers.

The automatic transmission can be filled with transmission oil as early as before the installation of the hybrid head. In particular, the automatic transmission can already be preassembled by the transmission manufacturer, tested and filled with transmission oil and then subsequently delivered to the vehicle manufacturer.

The automatic transmission can be closed oil-tight by means of a casing cover on the side facing the hybrid head. The casing cover can be fastened with screws to the rest of the transmission casing from the side of the hybrid head at the transmission manufacturer.

A central "interface" between the hybrid head and the automatic transmission is formed by means of the output element on the side of the hybrid head and by means of the transmission input shaft, which is to be coupled in rotation with the output element, on the side of the automatic transmission. It can be provided that the transmission input shaft protrudes from the transmission casing or more specifically from a corresponding opening of the casing cover of the automatic transmission.

In order to prevent the automatic transmission from being damaged or rather from fouling during the transport from the transmission manufacturer to the vehicle manufacturer, the automatic transmission can be delivered with a protective cover on the side of the transmission input shaft. The protective cover can be, for example, a protective cover, that is placed or screwed on the face side of the transmission casing.

In order to supply the individual lubricating points of the automatic transmission with lubricating oil, a mechanically driven transmission oil pump is provided. The mechanically driven transmission oil pump can be arranged inside the transmission casing and can be driven by means of a drive shaft, which projects from the transmission casing, in particular, from an opening of the transmission cover. The drive shaft for the mechanically driven oil pump can be formed by a hollow shaft, in which the transmission input shaft is arranged in a rotatable manner. The hollow shaft and the transmission input shaft can be arranged coaxially and can project from the transmission cover of the automatic transmission as the "drive interfaces" of the automatic transmission. Therefore, before or while the hybrid head is connected by flanges to the automatic transmission casing, an "oil pump drive" of the hybrid head is coupled in rotation with the drive shaft for the transmission oil pump. The oil pump drive of the hybrid head can be connected to or more specifically can be coupled, for example, with the drive shaft of the automatic transmission, which is provided for driving the mechanically driven transmission oil pump, by means of one or more flywheels.

In order to ensure a flawless alignment of the hybrid head in relation to the automatic transmission, the hybrid head casing can be centered radially in relation to the transmission casing by means of a centering collar.

In order to seal the hybrid head casing relative to the automatic transmission casing, a seal, which seals oil-tight, can be inserted between a front face of the hybrid head casing that faces the automatic transmission casing and a front face of the automatic transmission casing that faces the hybrid head casing. The seal may be, for example, a surface seal, for example, made of paper, an elastomer seal, a fluid seal, a molded rubber seal (in the bypass to a screw connection until it makes contact with the end stop) or any other oil sealing seal.

When the hybrid head casing is connected by flanges, the hybrid head casing can be fastened with screws to the transmission casing from the side of the hybrid head casing, so that the seal that is inserted between the two casings is compressed.

According to a further development of the invention, the hybrid head has not only the function of a torque superposition device, but also has a clutch, which is intended for and is suitable as a starter clutch. This clutch enables a startup from a stationary state and driven by one of the two "drive elements" or by both drive elements of the hybrid head. A hydraulic actuating unit can be provided in the hybrid head to actuate the starter clutch.

The starter clutch can be a multiple disk clutch that runs in an oil, in particular in the transmission oil of the automatic transmission. To the extent that the starter clutch is attached to the oil circuit of the automatic transmission, it can be provided that the starter clutch is supplied with transmission oil of the automatic transmission by way of an oil duct, which is provided in the transmission input shaft and which has one or more radially extending branch ducts.

According to a further development of the invention, the hybrid head has, furthermore, a torsional vibration damper, which is arranged in the hybrid head and which is supposed to minimize or more specifically to damp the torsional vibrations that are introduced into the transmission input shaft of the automatic transmission.

When the electric machine is installed in the hybrid head, it is necessary to make sure that the rotor of the electric machine is aligned exactly coaxially in relation to the stator. The invention proposes the use of a positioning element, which acts as a mounting aid and which positions the rotor exactly in relation to the stator when the electric machine is not yet installed. Then the "entire" electric machine can be installed in the hybrid head as a prefabricated and pretested module. Then the stator is connected, for example, screwed, to the hybrid head casing. The rotor is connected or more specifically fastened with screws to the rotor drive element. This arrangement ensures that the rotor stays positioned exactly in relation to the stator after the stator and the rotor have been installed and mounted. Once the stator and the rotor have been securely fastened by means of screws, the positioning element that is used as the mounting aid can be removed.

After the installation of the electric machine, an internal combustion engine-drive element of the hybrid head is coupled with a crankshaft of an internal combustion engine. The internal combustion engine-drive element is, as a general principle, a component that can be driven directly or indirectly by the internal combustion engine or more specifically a crankshaft of the internal combustion engine. According to the terminology used in the introductory part, the internal combustion engine-drive element corresponds to the first input of the hybrid head.

The hybrid head casing can be connected by flanges directly to the casing of the internal combustion engine or can be connected by flanges by means of a spacing element that has a shape similar to a ring. In order to compensate for the torsional vibrations of the crankshaft of the internal combustion engine, this crankshaft can be coupled with the internal combustion engine-drive element by means of a torsional vibration damper. To put it more precisely, an output element of the torsional vibration damper can be fastened with screws to the internal combustion engine-drive element of the hybrid head; and then a drive element of the torsional vibration damper can be coupled in rotation with the crankshaft. A starter gear ring, which interacts with a starter or more specifically a starter motor, can be fastened with screws to the drive element of the torsional vibration damper. The internal combustion engine can be started by means of the starter or more specifically the starter motor.

In order to be able to compensate for the relative movements of the drive element of the torsional vibration damper in the axial direction in relation to the crankshaft of the internal combustion engine when the drive element is in operation, the crankshaft can be connected to the drive element of the torsional vibration damper by means of an element (so-called "flexplate") that is elastic in the axial direction of the crankshaft. The elastic element can be screwed together with the drive element of the torsional vibration damper by means of a plurality of screws that are arranged in such a way that they are distributed in the circumferential direction.

According to a further development of the invention, the screws are arranged obliquely in relation to the axial direction of the drive train or more specifically the crankshaft. These screws are screwed into the drive element of the torsional vibration damper preferably from the side of the internal combustion engine. In order to make it possible to tighten the screws, a mounting opening can be provided in the wall of the casing of the internal combustion engine. When the torsional vibration damper or rather the drive train is in suitable rotational positions, the individual screws can be tightened or loosened one after the other in succession by way of the mounting opening using a socket wrench.

Other objects, advantages and novel features of the present invention will become apparent from the following detailed description of one or more preferred embodiments when considered in conjunction with the accompanying drawings.

DETAILED DESCRIPTION OF THE DRAWINGS

The mounting of the individual components is explained below beginning with FIG. 2, whereby reference is also made over and over again to the assembling drawing of FIG. 1.

Figure 2:
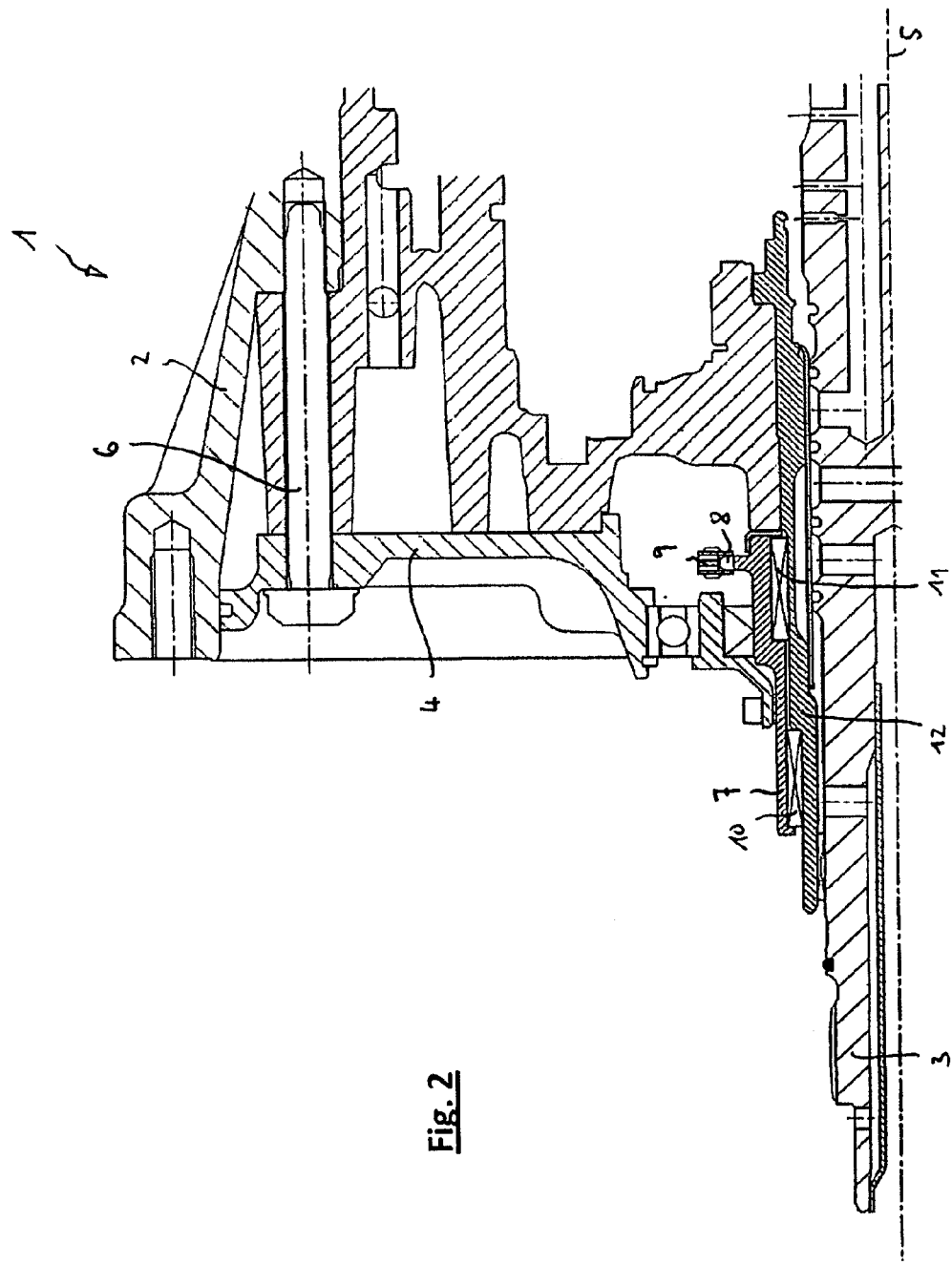
FIG. 2 shows an end of an automatic transmission, according to the invention, on the side of the hybrid head.

FIG. 2 is a half sectional view of a drive-sided portion of an automatic transmission 1, which comprises a transmission casing 2 and a transmission input shaft 3 that is arranged in a rotatable manner. The transmission casing of the automatic transmission 1 is closed by means of a casing cover 4 on the drive side. The casing cover 4 is screwed to the casing element, which is marked with the reference numeral 2, by means of screws 6 that are screwed in from the transmission input side in the axial direction 5 of the transmission input shaft 3.

It is very clear from FIG. 2 that an oil pump drive 7, which is formed by means of a hollow shaft, projects from the transmission casing 2 on the drive side. The oil pump drive 7 is mounted in the transmission casing in such a manner that it can be rotated. Said oil pump drive comprises a gearwheel 8, which is coupled with a mechanically driven oil pump (not illustrated), which is arranged in the transmission casing 2, by means of a chain 9 or a belt. The oil pump drive 7 is mounted by means of roller bearings 10, 11 on a "guide wheel support" 12, which is mounted rigidly in relation to the transmission casing 2.

The oil pump (not illustrated) can be, for example, a rotary vane pump. Said oil pump can be arranged parallel to the axial direction and offset relative to the axis 5. As an alternative to the arrangement shown in FIG. 2, the gearwheel 8 can also be an immediate part of an internal gear pump or a sickle pump that is arranged coaxially to the axis 5.

If the automatic transmission 1 is not intended to be used for a hybrid drive train, but rather for a conventional drive train, then the guide wheel support 12 serves to mount a guide wheel of a torque converter. Hence, the automatic transmission, shown in FIG. 1, can be used for both a conventional drive train and also for a hybridized drive train. It is very clear from FIG. 2 that the guide wheel support 12 is a type of hollow shaft that is rigidly mounted on the casing; and the hollow shaft in turn is disposed in the oil pump drive 7 that is constructed as a hollow shaft. The transmission input shaft 3 in turn is disposed in the hollow shaft that forms the guide wheel support 12.

The automatic transmission 1 can be completely prefabricated and tested at the transmission manufacturer. In order to avoid damages during transport, in particular, of those components 3, 7, 12, which project from the transmission casing 2, it can be provided that the drive side of the automatic transmission 1 is protected against damage and fouling during transport by means of a protective cover.

Figure 3:
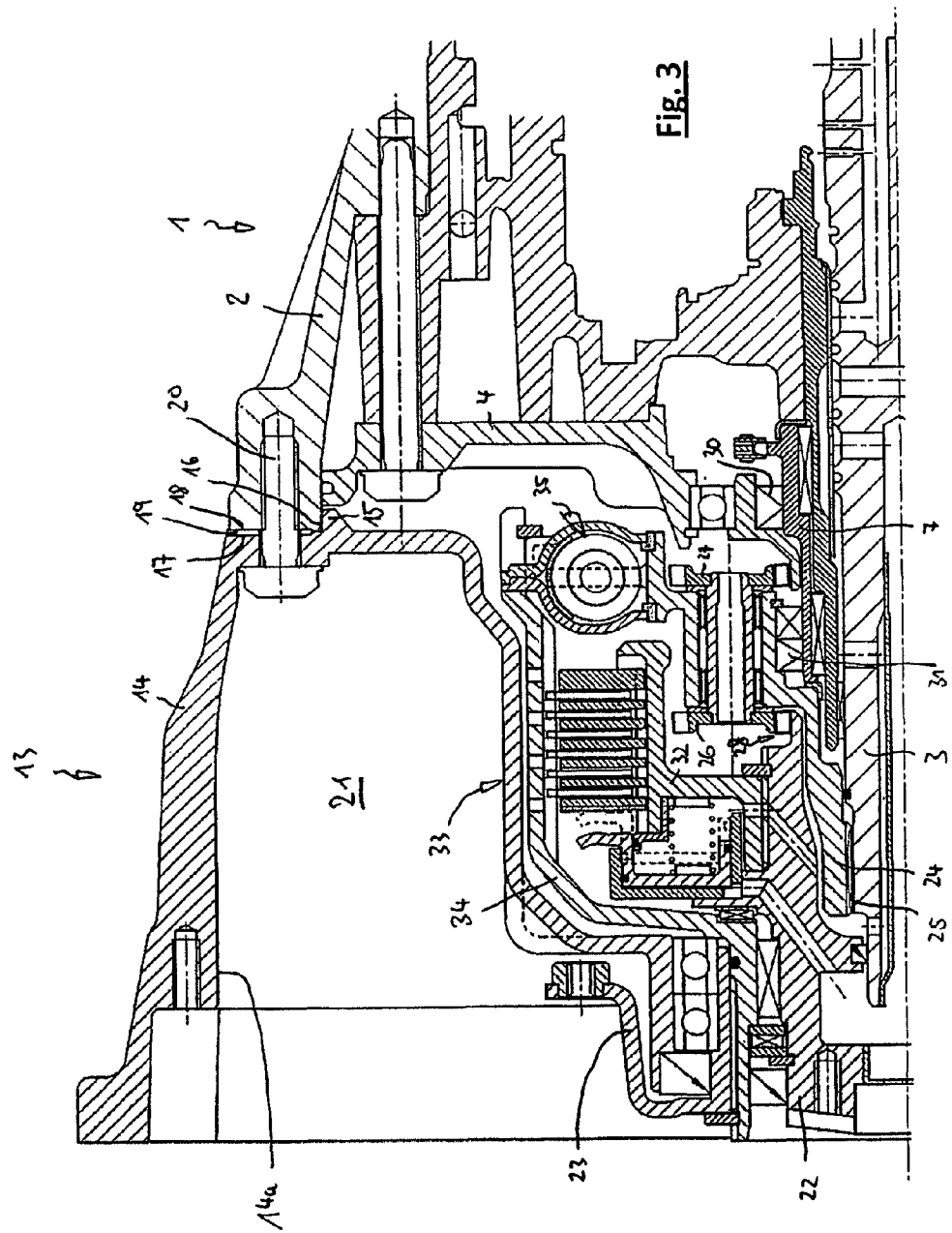
FIG. 3 shows the automatic transmission from FIG. 2, wherein a hybrid head is connected by flanges to the automatic transmission.

After the protective cover has been removed, a hybrid head 13 can be connected by flanges to the automatic transmission 1, as depicted in FIG. 3. The hybrid head 13 has a hybrid head casing 14, which is centered in relation to the casing 2 of the automatic transmission 1 by means of a centering collar 15, which interacts with a shoulder 16 of the transmission casing 2. A seal 19, which seals off in an oil-tight manner the hybrid head casing 14 from the automatic transmission casing 2, is inserted between a front face 17 of the hybrid head casing 14 that faces the automatic transmission casing 2 and a front face 18 of the automatic transmission casing 2 that faces the hybrid head casing 14.

Then the hybrid head casing 14 is fastened to the automatic transmission casing 2 by means of a plurality of screws, which are distributed in the circumferential direction and of which only one screw 20 is shown in this embodiment, from the side of the hybrid head casing 14. The screw 20 is tightened in an annularly cylindrical chamber 21 of the hybrid head casing 14, into which the electric machine is subsequently installed.

The hybrid head 13 acts as a torque superposition device. Said hybrid head has a first input, which is arranged in a rotatable manner and which is referred to as the internal combustion engine-drive element 22 in the following. The hybrid head also has a second input, which is referred to as the rotor drive element 23 in the following, and an output element 24, which is coupled in rotation with the transmission input shaft 3 of the automatic transmission 1 by means of the shaft-hub connection 25.

The output element 24 is mounted by means of a planet carrier, which is arranged in a rotatable manner; and the first and second planet wheels 26, 27 of a plurality of double planets, which are distributed in the circumferential direction, are mounted in turn in this planet carrier. The first planet wheels 26 mesh with the associated teeth 28 of the internal combustion engine-drive element 22. The second planet wheels 27 mesh with a wheel 29, which is mounted in the casing cover 4 and which is coupled with the oil pump drive 7 by means of a flywheel 30. The output element 24 is also coupled with the oil pump drive 7 by way of a flywheel 31.

An inner disk carrier 32 of a disk clutch 33, which is configured as a starter clutch, is securely connected to the internal combustion engine-drive element 22. An outer disk carrier 34 of the disk clutch 33 is mounted in a rotatable manner in the hybrid head casing 14 and is elastically coupled in rotation with the output element 24, which acts as the planet carrier, in the direction of rotation by way of a torsional vibration damper 35. When the disk clutch 33 is closed, a torque transmission from the internal combustion engine-drive element 22 to the output element 24 is then possible.

The mechanical oil pump, which is installed in the automatic transmission 1, is driven, as a function of the operating state, by the internal combustion engine or the electric machine (see below) by way of the flywheel 30 or 31 respectively.

It is very clear from FIG. 3 that the hybrid head 13 has primarily mechanical components and a hydraulic actuating unit 36 that is provided for actuating the disk clutch 33.

Figure 4:
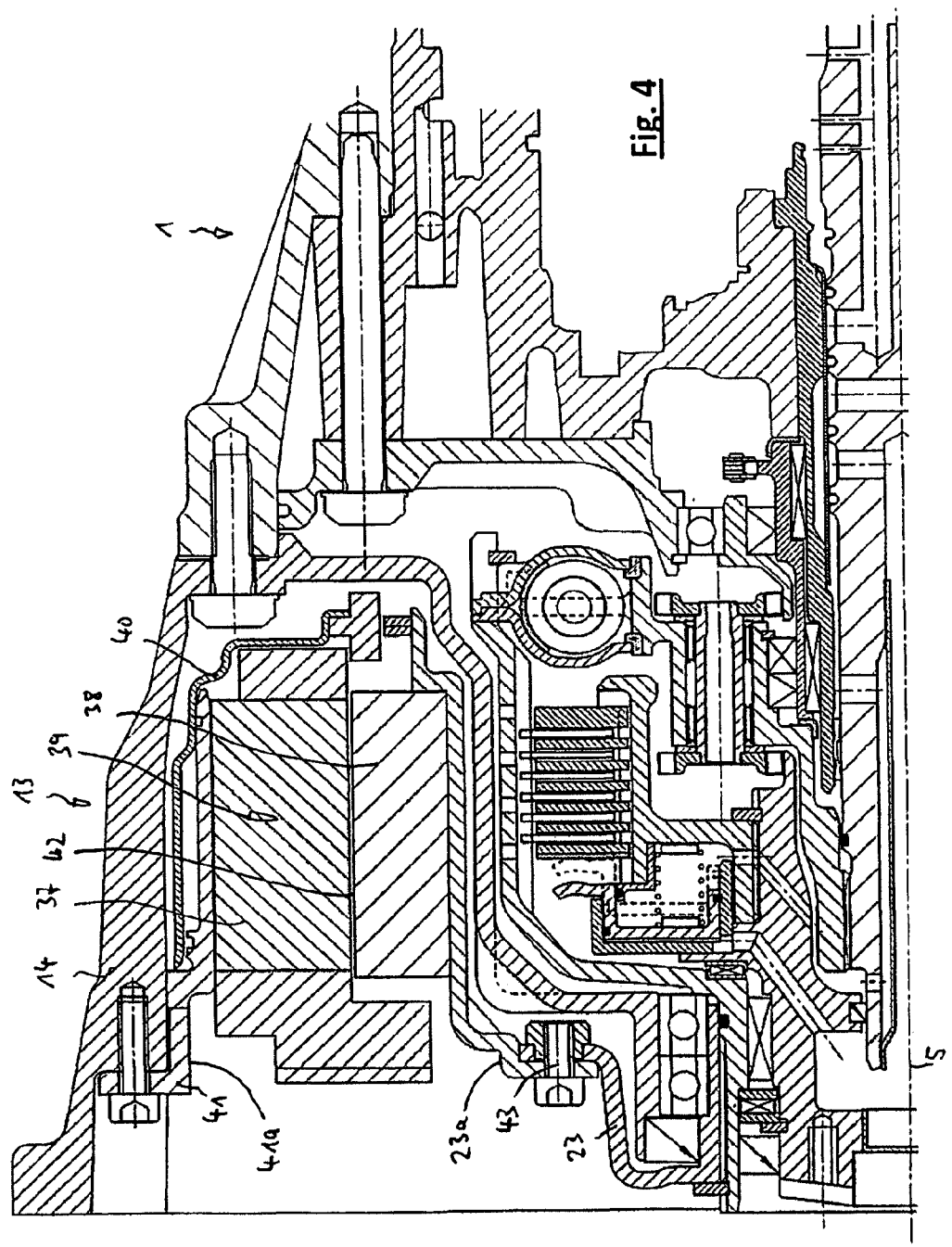
FIG. 4 shows the unit that is depicted in FIG. 3; and in this case an electric machine is installed in the hybrid head.
Figure 5:
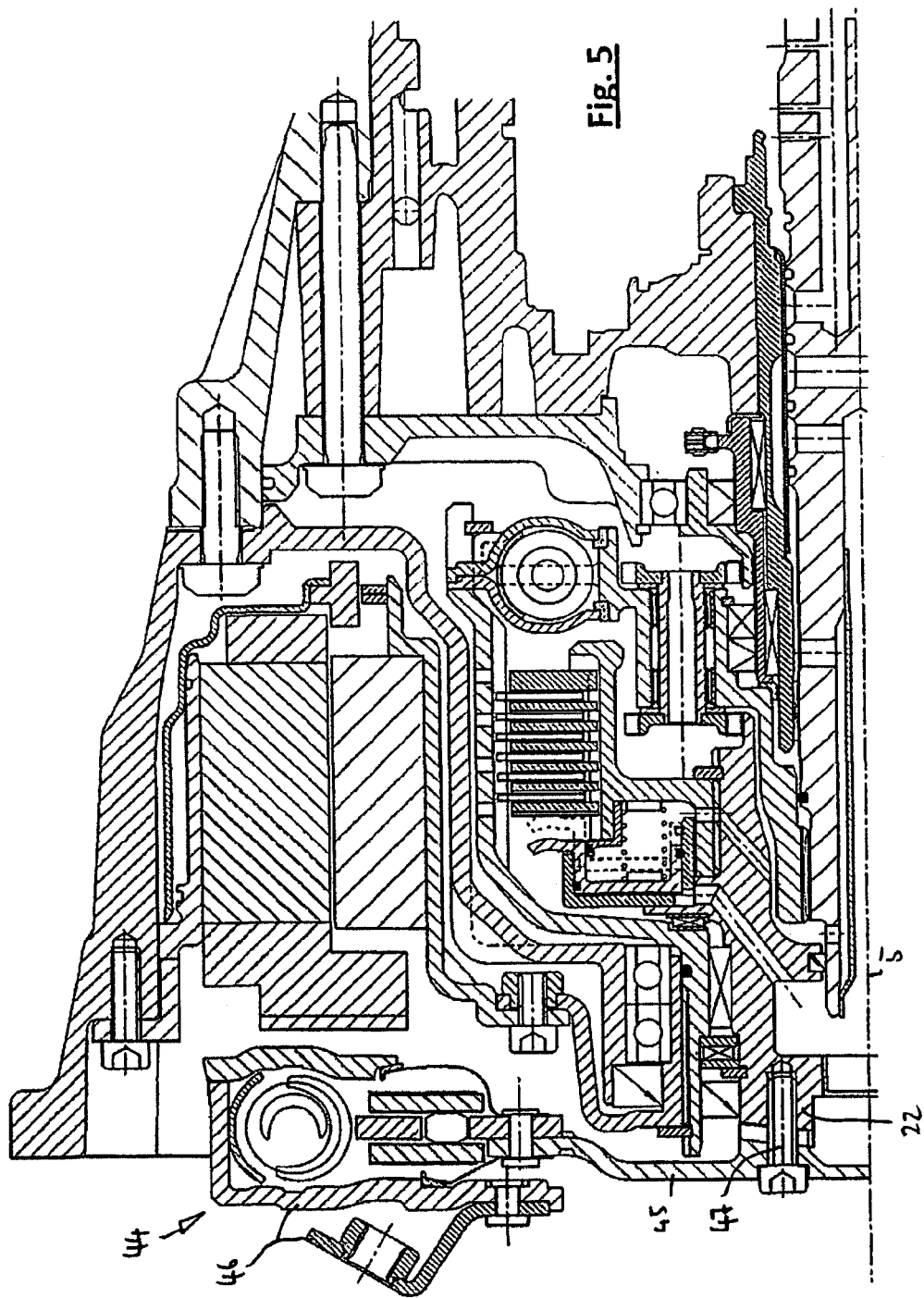
FIG. 5 shows the arrangement from FIG. 4; and in this case a torsional vibration damper is mounted on the hybrid head.

FIG. 4 shows the next assembly step. After the hybrid head 13 is connected by flanges to the automatic transmission 1, the electric machine 39, which is formed by means of a stator 37 and a rotor 38, is installed in the circularly cylindrical chamber 21 (cf. FIG. 3) of the hybrid head 13. An inner surface 14a (cf. FIG. 3) serves as the centering surface for the stator 37. For this purpose the stator 37 is positioned and fixed in the hybrid head casing 14 by means of a retaining plate 40 and the clamping elements 41, which are fastened with screws to the hybrid head casing 14 from the side of the internal combustion engine (cf. FIG. 1).

In the course of mounting the electric machine 39, the stator 37 and the rotor 38 are positioned exactly relative to each other by means of a mounting aid, so that it is ensured that a predefined air gap 42 is maintained between the stator 37 and the rotor 38. In this case the surface 41a of the clamping elements 41 and the surface 23a of the rotor drive element 23 serve as the centering surfaces for applying the mounting aid (not illustrated).

Then the stator 37 is fixed in the hybrid head 13 in the manner described above. The rotor 38 is screwed together with the rotor drive element 23 of the hybrid head by means of a plurality of screws 43 that are distributed in the circumferential direction and extend in the axial direction 5. The screw fastening takes place from the side of the internal combustion engine. After the stator 37 and the rotor 38 have been secured in position, the mounting aid (not illustrated) can be removed.

In the next assembly step a torsional vibration damper 44, which comprises an output element 45 and a drive element 46, is mounted. To this end the output element 45 is screwed together with the internal combustion engine-drive element 22 by means of a plurality of screws 47 that are distributed in the circumferential direction and extend in the axial direction 5.

Figure 1:
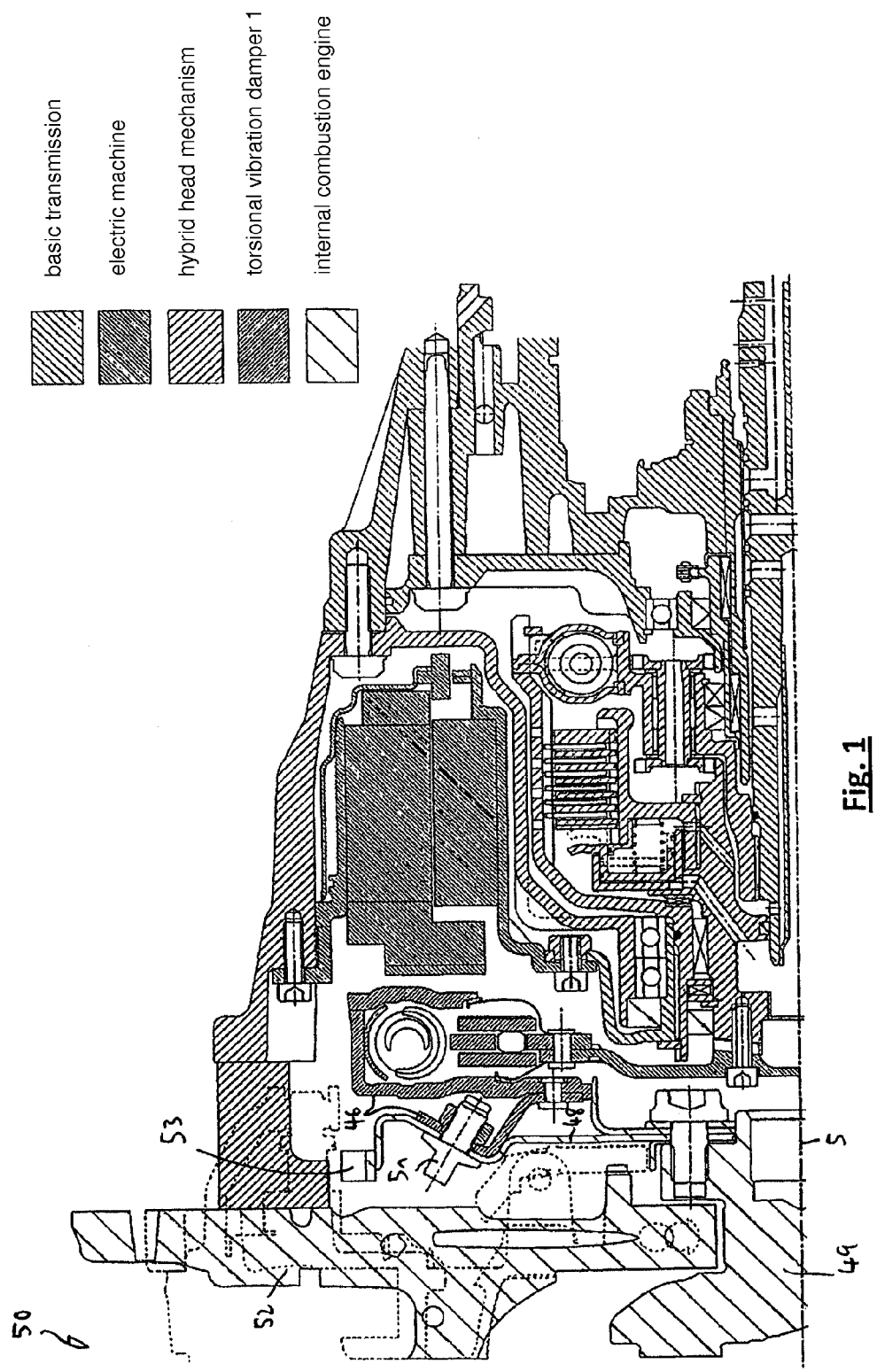
FIG. 1 is a sectional view of an assembling drawing of a hybrid head, which is connected by flanges to an internal combustion engine and which in turn is connected by flanges to an automatic transmission.

In an additional subsequent assembly step, the drive element 46 of the torsional vibration damper is coupled in rotation, as shown in FIG. 1, with a crankshaft 49 of an internal combustion engine 50 by means of a plate (flexplate) 48, which is flexible in the axial direction 5. The connection between the elastic plate 48 and the drive element 46 is performed by means of a plurality of screws 51, which are distributed in the circumferential direction and are arranged obliquely in relation to the axial direction 5 in this embodiment. In a suitable rotary position the screws can be tightened or loosened by way of a mounting opening (not illustrated) that is provided in the wall 52 of the casing of the internal combustion engine. To the extent that there is adequate installation space, the screws 51 can also be arranged parallel to the axial direction 5.

For the sake of completeness, the starter gear ring 53 should also be mentioned. This starter gear ring is arranged on the elastic plate 48 and interacts with a starter (not shown in detail in this embodiment), which is provided for starting the internal combustion engine 50.

Figure 6:
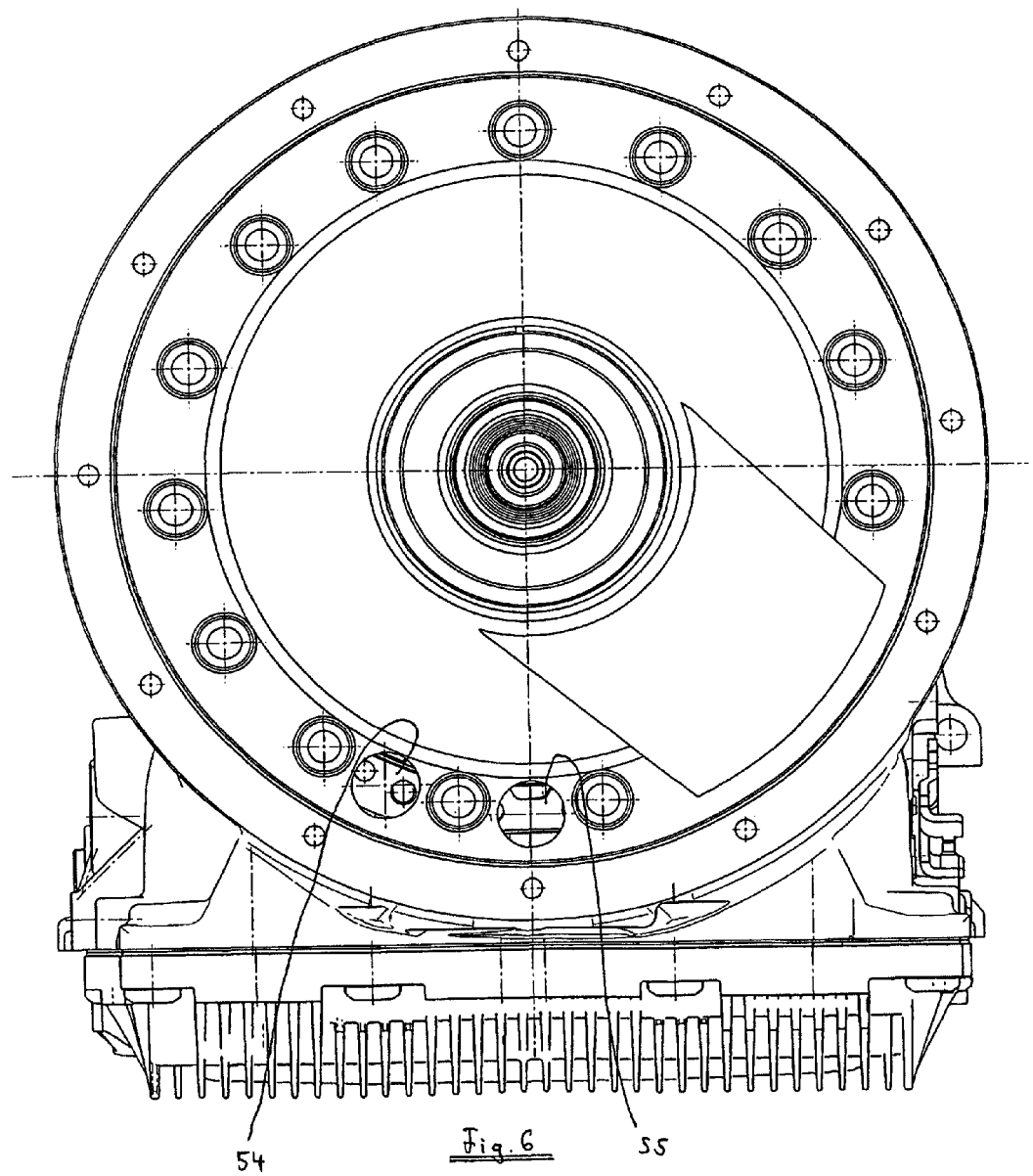
FIG. 6 is a front view of the basic transmission from the drive side.

FIG. 6 is a front view of the automatic transmission 1 (basic transmission) from the drive side. The reference numerals 54, 55 indicate where the oil returns can be arranged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for mounting the drive train components of a hybrid drive in a vehicle, wherein the method comprises:
   providing an automatic transmission comprising: a transmission casing and a transmission input shaft;
   providing a hybrid head, which is pre-mounted as a separate assembly prior to being provided, and comprising: a hybrid head casing, a rotor drive element and an output element;
   providing an electric machine comprising: a stator and a rotor;
   connecting the hybrid head casing to the transmission casing via flanges;
   coupling the output element in rotation to the transmission input shaft by means of a shaft-hub connection; and
   subsequent to the act of connecting the hybrid head casing to the transmission casing via flanges, installing the electric machine in the hybrid head casing, via connecting the stator to the hybrid head casing, and the rotor to the rotor drive element.

2. The method of claim 1, wherein the automatic transmission is filled with transmission oil as early as before the installation of the hybrid head.

3. The method of claim 1, wherein the automatic transmission is closed by means of a casing cover on the side facing the hybrid head, wherein the casing cover is screwed together with the rest of the transmission casing from the side of the hybrid head.

4. The method of claim 1, wherein the transmission input shaft projects from the transmission casing.

5. The method of claim 1, wherein the automatic transmission has a hollow shaft, which projects from the transmission casing and which acts as the drive shaft for a mechanically driven transmission oil pump, which is arranged in the transmission casing, wherein an oil pump drive of the hybrid head is coupled with the drive shaft for the transmission oil pump before or while the hybrid head casing is connected by flanges to the transmission casing.

6. The method of claim 5, wherein the transmission input shaft is arranged in the hollow shaft.

7. The method of claim 1, wherein the hybrid head casing is centered radially in relation to the transmission casing by means of a centering collar.

8. The method of claim 1, wherein a seal, which seals off in an oil-tight manner the hybrid head casing, is inserted between a front face of the hybrid head casing that faces the automatic transmission casing and a front face of the automatic transmission casing that faces the hybrid head casing.

9. The method of claim 1, wherein the hybrid head casing is connected to the automatic transmission casing, in particular, is fastened with screws to the automatic transmission casing, from the side of the hybrid head casing.

10. The method of claim 1, wherein the hybrid head comprises a starter clutch.

11. The method of claim 10, wherein the starter clutch can be actuated by means of a hydraulic actuating unit.

12. The method of claim 10, wherein the starter clutch is a multiple disk clutch that runs in the transmission oil of the automatic transmission.

13. The method of claim 10, wherein the starter clutch is supplied with transmission oil of the automatic transmission by way of an oil duct, which is provided in the transmission input shaft.

14. The method of claim 1, wherein the hybrid head has a torsional vibration damper.

15. The method of claim 1, wherein, prior to the installation of the electric machine in the hybrid head, the rotor is held in a predefined position in relation to the stator by means of a positioning element, which is provided only for the installation, wherein the positioning element is removed after the stator has been connected to the hybrid head casing, and after the rotor has been connected to the rotor drive element.

16. The method of claim 1, wherein the stator is fastened with screws to the hybrid head casing.

17. The method of claim 1, wherein the rotor is fastened with screws to the rotor drive element.

18. The method of claim 16, wherein the stator is fastened with screws to the hybrid head casing from an internal combustion engine side of the hybrid head casing; and the rotor is fastened with screws to the rotor drive element from an internal combustion engine side of the hybrid head casing.

19. The method of claim 1, wherein, after the installation of the electric machine, an internal combustion engine-drive element of the hybrid head is coupled with a crankshaft of an internal combustion engine.

20. The method of claim 1, wherein the hybrid head is a component, with which a torque, applied to an internal combustion engine-drive element, can be superposed on a torque, which is generated by the electric machine, to a torque to be transmitted to the transmission input shaft.

21. The method of claim 1, wherein the hybrid head comprises primarily or exclusively mechanical and hydraulic components.

22. The method of claim 19, wherein the hybrid head casing is connected by flanges directly to a casing of the internal combustion engine-drive element or is connected by flanges by means of a spacing element.

23. The method of claim 19, wherein the internal combustion engine-drive element of the hybrid head is coupled in rotation with the crankshaft by means of a torsional vibration damper.

24. The method of claim 1, wherein an output element of a torsional vibration damper is fastened with screws to an internal combustion engine-drive element of the hybrid head; and then a drive element of the torsional vibration damper is coupled in rotation with a crankshaft.

25. The method of claim 24, wherein a starter gear ring, which is intended for starting an internal combustion engine, is fastened with screws to the drive element of the torsional vibration damper.

26. The method of claim 1, wherein a crankshaft is connected to a drive element of a torsional vibration damper by means of an element that is elastic in an axial direction of the crankshaft.

27. The method of claim 26, wherein the elastic element is screwed together with a drive element of the torsional vibration damper by means of a plurality of screws that are distributed in a circumferential direction.

28. The method of claim 27, wherein the screws are screwed into the drive element of the torsional vibration damper obliquely in relation to the axial direction and from the side of an internal combustion engine.

29. The method of claim 28, wherein a wall of a casing of the internal combustion engine has a mounting opening, by means of which the individual screws can be tightened or loosened with a socket wrench, when the torsional vibration damper is in a rotational position.

* * * * *